US007602765B2

(12) United States Patent
Cho

(10) Patent No.: US 7,602,765 B2
(45) Date of Patent: Oct. 13, 2009

(54) METHOD FOR SYNCHRONIZING STATUS INFORMATION OF IMPS CLIENT

(75) Inventor: Song-Rae Cho, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 29 days.

(21) Appl. No.: 11/147,494

(22) Filed: Jun. 7, 2005

(65) Prior Publication Data

US 2005/0271004 A1 Dec. 8, 2005

Related U.S. Application Data

(60) Provisional application No. 60/577,583, filed on Jun. 8, 2004.

(30) Foreign Application Priority Data

May 16, 2005 (KR) .............. 10-2005-0040905

(51) Int. Cl.
  *H04J 3/06* (2006.01)
(52) U.S. Cl. .............. 370/350; 370/331; 370/352; 370/401; 709/203; 709/206; 709/207
(58) Field of Classification Search .............. 370/350, 370/216, 328, 331, 352, 401; 709/203, 206, 709/207, 227
See application file for complete search history.

(56) References Cited

U.S. PATENT DOCUMENTS

| 6,449,622 | B1 * | 9/2002 | LaRue et al. .............. 707/201 |
| 2001/0042104 | A1 * | 11/2001 | Donoho et al. .............. 709/207 |
| 2002/0129103 | A1 * | 9/2002 | Birkler et al. .............. 709/203 |
| 2004/0267796 | A1 * | 12/2004 | Shimogori .............. 707/101 |

FOREIGN PATENT DOCUMENTS

| JP | 10-229589 | 8/1998 |
| JP | 2003-132003 | 5/2003 |
| JP | 2003-526989 | 9/2003 |

(Continued)

OTHER PUBLICATIONS

Wireless Village: "The Mobile IMPS Initiative, Client-Server Protocol, Sessions and Transactions, Version 1.1" Online! Jul. 31, 2002, pp. 1-92, retrieved from http://www.openmobilealliance.org/tech/affiliates/wv/wvindex.html, on Sep. 1, 2005.

*Primary Examiner*—Nay A Maung
*Assistant Examiner*—Tuan H Nguyen
(74) *Attorney, Agent, or Firm*—Lee, Hong, Degerman, Kang & Waimey

(57) ABSTRACT

The present invention is related to synchronizing status information of an IMPS client in a wireless communication system. A server, which manages status information using version information, compares status information of contacts stored in association with version information received from a client to current status information. The server transmits changed status information to the corresponding client. Preferably, the server stores the current status information in association with new version information and informs the client about the new version information. The server stores at least two of the latest version information and respective status information. Accordingly, when a status information response message is lost in its transmission and the server receives a request for the status information from the client, the changed status information can be obtained.

18 Claims, 3 Drawing Sheets

FOREIGN PATENT DOCUMENTS

| | | |
|---|---|---|
| JP | 2003-308300 | 10/2003 |
| JP | 2004-140716 | 5/2004 |
| KR | 1020020009741 A | 2/2002 |
| WO | WO 00/69140 A | 11/2000 |
| WO | 02/073461 | 9/2002 |
| WO | 2004/008178 | 1/2004 |
| WO | 2004/034192 | 4/2004 |

* cited by examiner

FIG. 2A

| INFORMATION ELEMENT | Req. | TYPE | DESCRIPTION |
|---|---|---|---|
| MESSAGE-TYPE | M | GetPresenceRequest | MESSAGE IDENTIFIER |
| TRANSACTION-ID | M | STRING | IDENTIFYING TRANSACTION |
| SESSION-ID | O | STRING | SESSION ID FOR SESSION |
| USER-ID-LIST | C | STRUCTURE | IDENTIFIER LIST OF REQUESTED INSTANT MESSAGING USER |
| CONTACT-LIST-ID-LIST | C | STRUCTURE | IDENTIFYING A SET OF USER IDs |
| PRESENCE-ATTRIBUTE-LIST | O | STRUCTURE | STATUS INFORMATION ATTRIBUTE LIST. EMPTY LIST OR LOST LIST MEANS AVAILABILITY OF EVERY STATUS INFORMATION ATTRIBUTE |
| PRESENCE-DATA-VERSION-NUMBER | C | INTEGER | IN CASE OF FIRST STATUS INFORMATION REQUEST MESSAGE, IT IS OMITTED. WHEN STATUS INFORMATION HAS BEEN REQUESTED OR WHEN IT HAS STATUS INFORMATION DATA AND VERSION INFORMATION, IT IS INCLUDED. |

FIG. 2B

| INFORMATION ELEMENT | Req. | TYPE | DESCRIPTION |
|---|---|---|---|
| MESSAGE-TYPE | M | GetPresenceResponse | MESSAGE IDENTIFIER |
| TRANSACTION-ID | M | STRING | IDENTIFYING TRANSACTION |
| SESSION-ID | O | STRING | SESSION ID FOR SESSION |
| RESULT | C | STRUCTURE | RESULT WITH RESPECT TO REQUEST |
| PRESENCE-VALUE-LIST | O | STRUCTURE | USER ID LIST AND CORRESPONDING STATUS INFORMATION VALUE |
| PRESENCE-DATA-VERSION-NUMBER | M | INTEGER | VERSION INFORMATION WITH RESPECT TO STATUS INFORMATION |

METHOD FOR SYNCHRONIZING STATUS INFORMATION OF IMPS CLIENT

CROSS-REFERENCE TO RELATED APPLICATIONS

Pursuant to 35 U.S.C. § 119, this application claims the benefit of earlier filing date and right of priority to Korean Application No. 2005-40905, filed on May 16, 2005 and U.S. Provisional Application No. 60/577,583, filed on Jun. 8, 2004, the contents of which are hereby incorporated by reference herein in their entirety.

FIELD OF THE INVENTION

The present invention relates to Instant Messaging and Presence Services (IMPS), and more particularly, to a method for synchronizing status information of an IMPS client who transmits/receives data through a wireless Internet.

BACKGROUND OF THE INVENTION

Instant Messaging and Presence Services (IMPS) is the latest technique for a new communication device based on the Internet. The IMPS is used for exchanging status information, such as presence information, among a mobile device, a mobile communication service system and an Internet-based instant messaging service system. A remarkable feature of the IMPS is that it provides both the status service and the instant messaging service.

The status service provides a state of an IMPS client, a state of a user, and management of a list of users registered for a service. The instant messaging service allows an instant message including text, video, pictures or sound to be transmitted to or received from a user of a specific client or a user of a different instant messaging system.

A client is a device program used to contact and obtain information from a program on another device. Typically, the device is linked to a network such as the Internet. The IMPS system comprises a client mounted in a specific device, wherein the client implements the IMPS. The IMPS system also comprises a server for connecting a session to clients and transmitting status information and an instant message to a corresponding client.

Status information of contacts registered in the client and status information stored in the server can be synchronized using the two following methods.

One method is a status information notification method. When status information of a contact registered in one client changes, the server provides status information including the corresponding status information to other clients. When status information of a contact registered in the server is updated, the server transmits a status information notification request message (PresenceNotificationRequest) including the updated status information to a client. The client then responds with a status message.

In the status information notification method, whenever status information of a contact registered in the client changes, the server automatically provides the status information to the client. Even when a user of the corresponding client does not check the status information of the contact, the server continuously transmits the status information data to the client. Accordingly, although the user of the client does not need the status information of the contact, the status information is transmitted.

The second method is a status information acquiring method. Here, a client retrieves status information of contacts registered for the client itself from the server. When the client transmits a status information acquiring request message (GetPresenceRequest) comprising a user ID or a contact list name to the server, the server transmits a status information acquiring response message (GetPresenceResponse) comprising a result with respect to the request and a status attribute to the corresponding client.

However, the status information acquiring method is problematic. When status information is requested for contacts whose status has not been changed, the server continues to transmit through a wireless channel status information for every contact according to the corresponding request. Therefore, traffic increases and a channel is wasted.

SUMMARY OF THE INVENTION

The present invention is directed to synchronizing status information of an IMPS client in a wireless communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for synchronizing status information of a client program in a wireless communication system, the method comprising receiving in a server a status information request message from a client program, checking whether version information is included in the status information request message, comparing status information corresponding to the version information with current status information, and transmitting a status information response message to the client program comprising changed status information of a contact when the version information is included in the received status information request message.

In one aspect of the present invention, the step of transmitting the status information response message comprises comparing the status information corresponding to the version information with the current status information, obtaining the changed status information of the contact, storing the current status information in association with new version information, and transmitting the changed status information and the new version information to the client. The new version information is one step higher than the version information. The step of storing the current status information comprises storing the status information corresponding to the version information included in the status information request message.

In another aspect, the method further comprises storing the current status information of contacts associated with a version information initial value if the version information is not included in the received status information request message and transmitting a status information response message including status information of every contact and the version information initial value to the client.

Preferably, the client program is an IMPS client. The version information is a Presence-Data-Version-Number field in the status information request message.

In another embodiment of the present invention, a method for synchronizing status information of a client program in a wireless communication system comprises transmitting from a client program a status information request message comprising version information associated with a contact to a server, receiving a status information response message from the server, acquiring status information from the status information response message, updating status information of the contact, and storing new version information included in the status information response message.

Preferably, in the step of transmitting the status information request message, a first status information request message is transmitted without having version information. The new version information is one step higher than the version information. The client program is an IMPS client. The version information is a Presence-Data-Version-Number field in the status information request message.

In another embodiment of the present invention, a method for synchronizing status information of a client program in a wireless communication system comprises transmitting a status information request message by a client program, receiving the status information request message by a server, checking version information included in the status information request message by the server upon receiving the status information request message, comparing status information stored in association with a first value to current status information by the server if the version information is the first value, transmitting a status information response message comprising different status information and version information having a second value from the server to the client program, receiving the status information response message by the client program, updating status information of contacts by the client program upon receiving the status information response message, and storing the second value as version information by the client program.

In one aspect, in the step of transmitting the status information request message, if the status information request message is a first request message transmitted, the client program does not add the version information to the message.

In another aspect, in the step of transmitting the status information request message, if the status information request message not a first request message transmitted, the client program adds the version information stored in the client program itself to the message.

Preferably, the server stores at least one of a first value, a second value associated with the first value, and status information associated with the second value.

In a further aspect of the present invention, the method further comprises transmitting from the server to the client program a status information response message comprising status information of every contact and version information having the second value when there is no version information in the status information request message.

Preferably, the client program is an IMPS client. The version information is a Presence-Data-Version-Number field in the status information request message.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIGS. 2A and 2B are tables illustrating formats of status information request messages and status information response messages in accordance with one embodiment of the present invention.

DETAILED DESCRIPTION OF THE PREFERRED EMBODIMENTS

Figure 1:
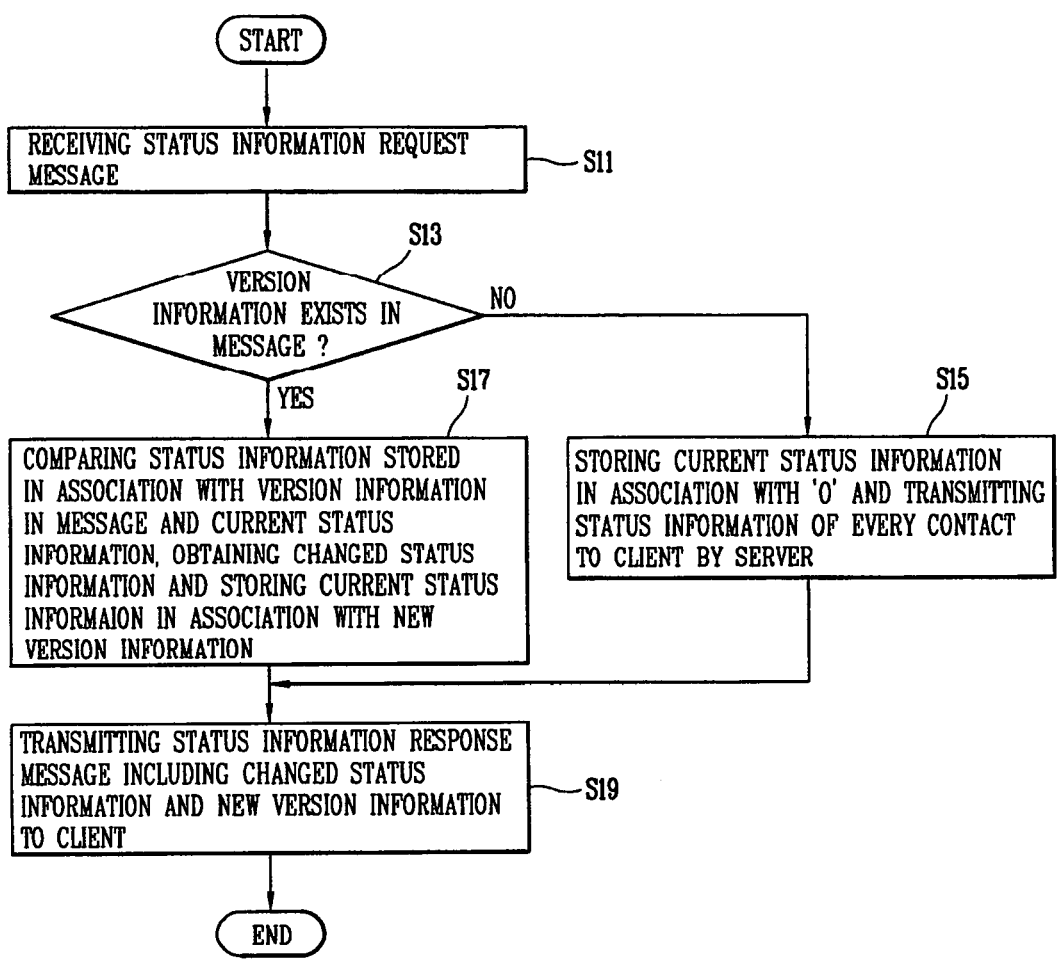
FIG. 1 is a flow chart illustrating a method for synchronizing status information in accordance with one embodiment of the present invention.

The present invention relates to a method for synchronizing status information of an IMPS client who transmits/receives data through a wireless Internet.

A method for synchronizing status information of an IMPS client in accordance with one embodiment of the present invention will now be described with reference to the accompanying drawings. A mobile terminal using wireless Internet technology is disadvantaged because its data transmission rate is slow compared to the data transmission rate of systems using a cable Internet. To improve the transmission rate in the mobile terminal, a client of an Instance Messaging and Presence Services (IMPS) mounted in the mobile terminal synchronizes status information of a contact by receiving the smallest amount of data from a server.

Accordingly, in a preferred embodiment of the present invention, a server transmits changed status information to the client in response to the client's request for status information. In this case, the server manages version information with respect to status information of contacts registered by the client. When the server receives a status information request from the client, the server compares status information stored in association with version information received from the client with current status information to obtain changed status information. The server then transmits the obtained changed status information to the corresponding client. After, the server stores the current status information by associating it with version information that is one-step higher than the previous version information.

Preferably, the present invention employs the status information acquiring method such that the client requests status information of contacts registered in the client itself from the server. The server then transmits the status information to the corresponding client upon receiving the request. Accordingly, the client and the server manage the status information in association with the version information.

FIG. 1 is a flow chart illustrating a method for synchronizing status information in accordance with one embodiment the present invention. When the client transmits a status information request message to the server to synchronize status information of contacts registered for the client itself with the latest information from the server, the server receives the message (step S11). The server then checks whether there is version information in the status information request message (step S13). In this respect, if the status information request message is the first request transmitted from the client, the client does not include version information therein. However, if the status information request message is not the first transmitted request, the client includes version information, which has been received most recently from the server, in the request message before transmitting.

If version information is not included in the status information request message, the server determines that the status information request message is the first request transmitted from the client. The server then stores status information of current contacts in association with version information "0" and transmits status information of every contact as a status information response message to the corresponding client (step S15).

If version information is included in the status information request message, the server compares the status information stored associated with the version information to the current status information to obtain changed status information of contacts. The server then stores status information of current contacts in association with new version information (step S17). Accordingly, the new version information is designated "previous version information +1". After, the server transmits a status information response message comprising the changed status information and the new version information to the client (step S19).

Preferably, the server comprises current status information of contacts, new version information, previous status information of contacts before being updated, and its version information, namely, the latest two version information items and respective status information.

If the status information response message is lost during its transmission, the server receives again the status information request message including previous version information from the client. The server then compares the status information associated with the previous version information to current status information to obtain changed status information with respect to contacts.

Preferably, when the status information response message is lost during its transmission, the server receives again the status information request message using the previous version information from the client. In this case, the server stores the latest two version information items and respective status information in order to accurately cope with the situation.

Upon receiving the status information response message, the client updates the status information included in the response message to synchronize it with the latest status information. The client then stores the new version information included in the response message. Thereafter, the new version information is added in a corresponding message when the client transmits a next status information request message.

FIGS. 2A and 2B are tables illustrating formats of status information request *messages and status information response messages in accordance with one embodiment of the present invention. As shown in FIG. 2A, the status information request message comprises a message type field and a transaction ID field. Optionally, it may include a session ID field and a status information attribute list field (Presence-Attribute-List). Furthermore, it may conditionally include a user ID list field, a status information attribute list field (Presence-Attribute-List) and a version information field (Presence-Data-Version-Number).

Preferably, the version information field (Presence-Data-Version-Number) is a newly added field in the present invention, which is not included in a first transmitted status information request message. Accordingly, when the client has version information to transmit, the corresponding version information is included.

Referring to FIG. 2B, the status information response message comprises a message type field, a transaction ID field and a version information field. Optionally, it may include a session ID field and a status information value list field (Presence-Value-List). Furthermore, it may conditionally include a result field with respect to a request. The version information field is a newly added field in the present invention, comprising new version information obtained by upgrading by one step the version information included in the status information request message.

When the server receives the status information request message without the version information, the server resets the current status information to "0". The server then adds the value in the version information field of the status information response message and transmits the response message.

Notably, the format of the version information field included in the status information request message and the status information response message may be defined in a character string type and an integer type, for example.

As so far described, the method for synchronizing status information of an IMPS client in accordance with the present invention has the following advantages. Because the server transmits only changed status information to the client to synchronize the status information, radio channel traffic as well as radio channel waste is reduced. Thus, channel efficiency is enhanced.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for synchronizing status information of a client program in a wireless communication system, the method comprising:

receiving in a server a status information request message from a client program;

checking whether version information is included in the status information request message;

comparing status information corresponding to the version information with current status information if the version information is included in the received status information request message; and transmitting a status information response message to the client program, the status information response message comprising changed status information of a contact when the version information is included in the received status information request message, wherein if the version information is not included in the status information request message, the server determines that the status information request message is a first request transmitted from the client program.

2. The method of claim 1, further comprising:

obtaining the changed status information of the contact;

storing the current status information in association with new version information; and transmitting the changed status information and the new version information to the client.

3. The method of claim 2, wherein the new version information is one step higher than the version information.

4. The method of claim 2, wherein the step of storing the current status information comprises storing the status information corresponding to the version information included in the status information request message.

5. The method of claim 1, further comprising:

storing the current status information of contacts associated with a version information initial value if the version information is not included in the received status information request message; and transmitting a status information response message including status information of every contact and the version information initial value to the client program.

6. The method of claim 1, wherein the client program is an IMPS (Instant Messaging and Presence Service) client.

7. The method of claim 1, wherein the version information is a Presence-Data-Version-Number field in the status information request message.

8. A method for synchronizing status information of a client program in a wireless communication system, the method comprising:

transmitting from a client program a status information request message comprising version information associated with a contact to a server, wherein the server checks whether version information is included in the status information request message and compares status information corresponding to the version information with current status information;

receiving a status information response message from the server;

acquiring status information from the status information response message;

updating status information of the contact; and storing new version information included in the status information response message, wherein a first status information request message is transmitted from the client program without having version information.

9. The method of claim 8, wherein the new version information is one step higher than the version information.

10. The method of claim 8, wherein the client program is an IMPS (Instant Messaging and Presence Service) client.

11. The method of claim 8, wherein the version information is a Presence-Data-Version-Number field in the status information request message.

12. A method for synchronizing status information of a client program in a wireless communication system, the method comprising:

transmitting a status information request message by a client program;

receiving the status information request message by a server;

checking whether version information is included in the status information request message upon receiving the status information request message;

checking the version information included in the status information request message by the server if the version information is included in the received status information request message;

comparing status information stored in association with a first value to current status information by the server if the version information is the first value;

transmitting a status information response message comprising different status information and version information having a second value from the server to the client program;

receiving the status information response message by the client program;

updating status information of contacts by the client program upon receiving the status information response message; and storing the second value as version information by the client program.

13. The method of claim 12, wherein, in the step of transmitting the status information request message, if the status information request message is a first request message transmitted, the client program does not add the version information to the message.

14. The method of claim 12, wherein, in the step of transmitting the status information request message, if the status information request message is not a first request message transmitted, the client program adds the version information stored in the client program to the message.

15. The method of claim 12, wherein the server stores at least one of a first value, a second value associated with the first value, and status information associated with the second value.

16. The method of claim 12, further comprising transmitting from the server to the client program a status information response message comprising status information of every contact and version information having the second value when there is no version information in the status information request message.

17. The method of claim 12, wherein the client program is an IMPS client.

18. The method of claim 12, wherein the version information is a Presence-Data-Version-Number field in the status information request message.

* * * * *